(No Model.)
W. T. RUSK.
COTTON CHOPPER.
No. 578,468. Patented Mar. 9, 1897.
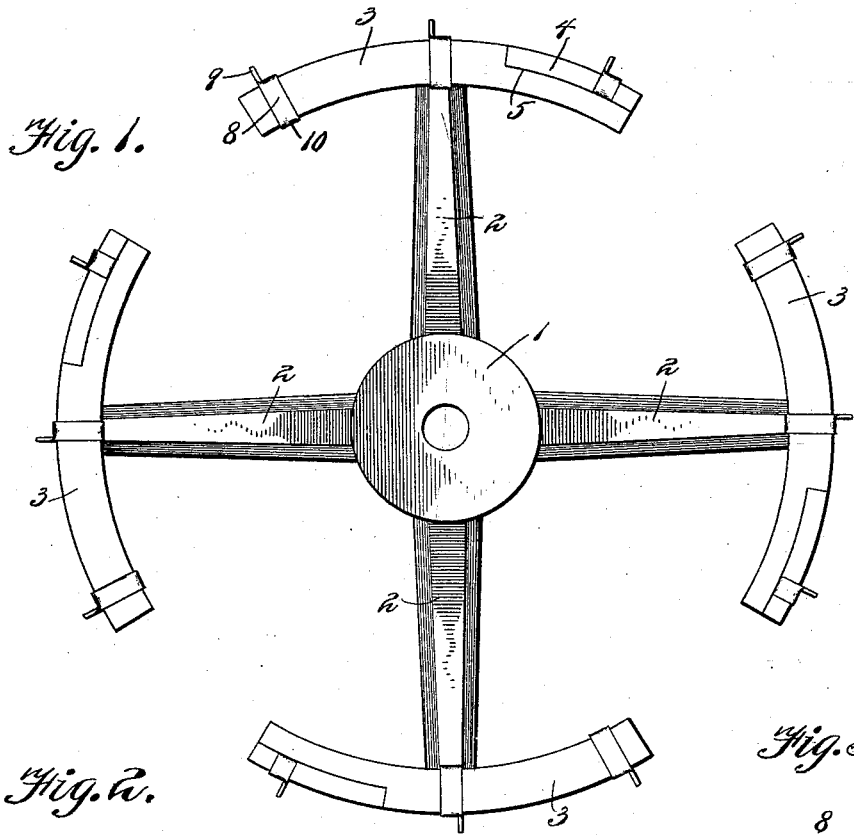
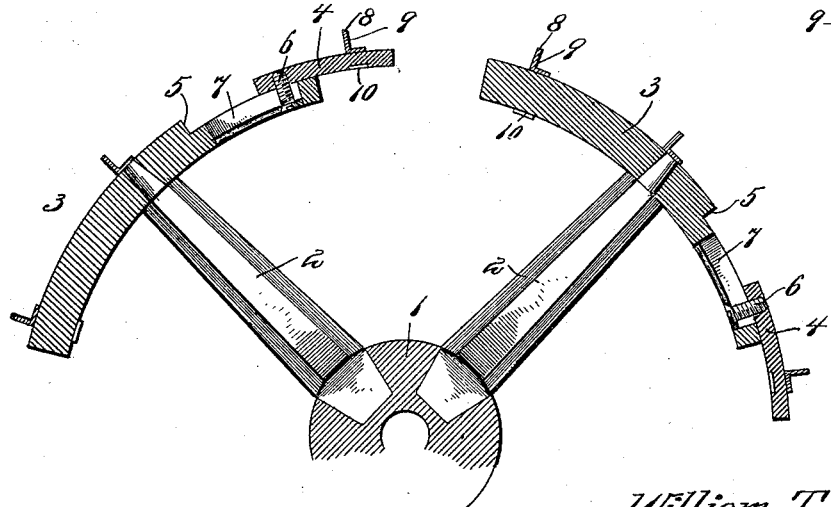
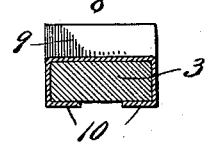
Witnesses
Milton O'Connell
V. B. Hillyard.
Inventor
William T. Rusk,
By his Attorneys,
C A Snow & Co.

UNITED STATES PATENT OFFICE.

WILLIAM THOMAS RUSK, OF NACOGDOCHES, TEXAS.

COTTON-CHOPPER.

SPECIFICATION forming part of Letters Patent No. 578,468, dated March 9, 1897.

Application filed December 21, 1896. Serial No. 616,497. (No model.)

*To all whom it may concern:*

Be it known that I, WILLIAM THOMAS RUSK, a citizen of the United States, residing at Nacogdoches, in the county of Nacogdoches and State of Texas, have invented a new and useful Cotton-Chopper, of which the following is a specification.

This invention relates to means for thinning the rows of cotton-plants, and aims to provide a device in the form of a wheel which can be applied to any style of plow or cultivator whereby the plants crushed may be covered and by means of which the work may be expeditiously and thoroughly performed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a chopping-wheel constructed in accordance with this invention. Fig. 2 is a detail view showing the means for varying the space between the rim-sections. Fig. 3 is a transverse section showing the manner of attaching a knife to a rim-section of the wheel.

Corresponding and like parts are referred to in the following description and indicated in the several views of the drawings by the same reference-characters.

The wheel is composed of a hub 1, spokes 2, and rim-sections 3, the latter having spaces between their opposing ends to receive the plants to be left standing. These parts, the hub, spokes, and rim-sections, may be integrally formed or be separate and connected together in any substantial manner. Plates 4 are fitted to an end of each rim-section and are adjustable, so as to vary the space between the opposing ends of the rim-sections, so as to leave a greater or less number of plants standing, as may be desired. These plates 4 are fitted in depressions 5, formed in the outer side of the rim-sections at one end thereof and come flush with the tread-surface and edges of the rim-sections. A machine-screw 6 operates in a slot 7 and has screw-thread connection with the plate 4 of each rim-section and is the means for securing the plates in an adjusted position.

Blades or cutters 8 are secured to the rim-sections and are intended to supplement the crushing action thereof, so as to destroy the plants intended to be removed, and these blades or cutters are formed of plates having an edge portion bent outward substantially at right angles, as shown at 9, and having their end portions bent to embrace the edges of the rim-sections, as shown at 10, the bent ends 10 fitting in notches in the edges of the rim-sections, so as to hold the blades in a located position. Each plate 4 is provided with a blade or cutter which is secured thereto in substantially the same manner as the blades applied to the rim-sections. The bent ends of the blades are let into notches in the inner faces of the plates to come flush therewith, so as to permit the plates sliding freely over the rim-sections when adjusting them.

In practice the chopping-wheel is mounted upon a spindle, axle, or other support of a plow or cultivator and operates in advance of the shovels, so as to thin the rows of cotton, the shovels or plows throwing the soil over the plants crushed and cut by the rim-sections. By a proper adjustment of the plates 4 more or less of the plants may be left standing where desired.

Having thus described the invention, what is claimed as new is—

1. In a cotton-chopper, a wheel comprising a series of rim-sections having spaces between their opposing ends, and having a terminal portion formed with a depression, plates seated in the depressions and coming flush with the tread-surface and edges of the rim-sections and adjustable to vary the extent of the space between adjacent rim-sections, and means for securing the plates in an adjusted position, substantially as set forth.

2. In a cotton-chopper, a wheel composed of rim-sections having spaces between their opposing ends, plates applied to the rim-sections and adjustable to vary the space between the rim-sections, means for securing the plates in an adjusted position, and blades applied to the rim-sections and to the plates, substantially as set forth.

3. In combination, a wheel, and a blade comprising a plate having an edge portion bent substantially at right angles, forming a cutter, and having its end portions bent to embrace the edges of the rim of the wheel, substantially as set forth.

In testimony that I claim the foregoing as my own I have hereto affixed my signature in the presence of two witnesses.

WILLIAM THOMAS RUSK.

Witnesses:
T. G. ARNOLD,
THOS. E. BAKER.